2,739,944

STABILIZED METAL CATALYSTS FOR NAPHTHA REFORMING

Kenneth K. Kearby, Cranford, N. J., assignor to Esso Research and Engineering Company, a corporation of Delaware No Drawing. Application June 21, 1952,
Serial No. 294,910

7 Claims. (Cl. 252—466)

This invention relates to the preparation of catalysts for the reforming of hydrocarbons in the naphtha boiling range. More specifically, it relates to the preparation of a catalyst containing very small amounts or even trace amounts of a catalytic metal on a catalyst support. The present application is a continuation in part of my copending application Serial Number 213,669, having the same title, filed March 2, 1951, now Patent No. 2,708,187 issued May 10, 1955.

The catalytic metals with which this invention is concerned are metals of group VIII of the periodic system which are known to have a pronounced effect on splitting the carbon-hydrogen and carbon-carbon bonds of hydrocarbon molecules at elevated temperatures. The properties of nickel, iron, cobalt, platinum, palladium and the like are well known in this connection. This invention is particularly concerned with the use of noble metal catalysts in this group, specifically platinum, palladium, rhodium, iridium and the like.

Catalysts containing platinum have been described in the literature and used to some extent commercially for the reforming of naphthas. A well known disadvantage of such catalysts in this use, however, is the fact that they tend to lose activity after a period in use, which is particularly short when the catalyst is subjected to periodic regeneration by oxidation to remove carbonaceous deposits formed during the hydrocarbon conversion. A careful inspection of platinum catalysts which have lost activity in this way, by X-ray and other crystallographic techniques, indicates that the platinum which was originally present in a highly dispersed amorphous form has a tendency to grow into metallic crystals having a larger size and much lower surface area corresponding to their greatly reduced catalytic activity.

One object of the present invention is to prepare a noble metal catalyst which will retain the metal in the amorphous highly active condition during prolonged periods of use.

Another object is to prepare such a catalyst so as to withstand conditions of repeated oxidative regeneration without marked loss in activity.

Another object of the present invention is to prepare a platinum or other noble metal catalyst of the platinum group in such a manner that growth of the original finely divided amorphous particles into larger sized metallic crystals is retarded or substantially avoided.

According to the present invention the crystal growth tendency of amorphous or colloidal platinum or palladium deposited on a catalyst support can be markedly reduced by adding a stabilizing oxide in the form of a protective colloid at the same time the colloidal platinum or palladium is deposited. The exact function of this stabilizing oxide is not known, but crystallographic studies indicate that the particles of colloidal metal laid down in this way may be held in a framework of colloidal metal oxide which acts as a mechanical barrier inhibiting crystal growth. According to this theory, for the metal crystals to grow it is necessary for the original particles to be in contact with each other, and for them to reside in an environment which provides free space for crystal growth. The function of the stabilizing oxide provided according to the present invention may be either to prevent the platinum or other metal particles from coming into actual contact with each other or it may be partly to surround each metal particle with a gel structure which inhibits crystal growth by reducing the exposed surface area of each particle. Either or both of these functions may be involved and other mechanisms of deactivation not outlined here may explain this behavior in whole or in part.

The essence of the invention involves the deposition of the catalytic metal in colloidal dispersion simultaneously with the colloidal hydrated metal oxide which serves both as a protective colloid and as the catalyst support. It is only by carrying out such a simultaneous precipitation of these constituents that the stabilizing activity of the colloidal metal oxide to inhibit crystal growth on subsequent use can be fully realized. Various preparation methods, as described below, can be employed to accomplish this result. The physical structure and composition of the colloidal oxide support with which the metal is combined are closely related factors in determining the physical and chemical properties of the catalyst, as discussed in detail below. In certain cases, the use of a separate stabilizing protective colloid composed of the same metal oxide as that used for the catalyst support is preferred. In other cases, still a different metal oxide may be used as the protective colloid.

The amount of catalytic metal to be used is dictated by economic considerations, since the noble metals are very expensive and the cost of the catalyst varies almost in direct proportion to the amount of this constituent required. Experience has shown that very small amounts of these catalytic metals are adequate. Indeed a large amount of the catalytic metal may induce too high a degree of activity, resulting in an excessive tendency for the catalyst to form gas and to deposit carbonaceous degradation products during the hydrocarbon conversion step. Accordingly, the use of very small or trace amounts of the metallic constituents of the order of 0.05 to 2% by weight based upon the catalyst support is preferred. In those embodiments of the invention where a separate protective colloid is employed, its amount is also related to the amount of metallic constituent required, and is preferably from about 0.5% to 20% by weight of the catalyst support.

A particular advantage of the catalysts prepared according to the present invention is that they show a greater lasting effect for a small amount of catalytic metal than catalysts of similar composition prepared by previously recommended procedures. This is true whether the catalytic metal is incorporated into the surface of a stabilizing gel supported on a preformed catalyst carrier, or whether it permeates the whole mass of the catalyst carrier itself.

Certain advantages of this method, such as the more effective use of small amounts of catalyst metal, may be particularly apparent where the metal or its precursor and a stabilizing colloidal oxide are laid down simultaneously on a catalyst support. The chief advantages as to catalyst stability are realized when these two components are precipitated together to form a catalyst with or without using a separate supporting material. The procedure differs from conventional methods of preparing gel catalysts in that the colloidal metal (or its precursor) in this case is precipitated not as a plural gel but as particles which come down from a homogeneous solution at about the same time as the colloidal hydrous oxide is coagulated, regardless of the time when the separate precipitation and coagulation reactions are initiated.

The nature of the colloidal dispersion of the catalytic metal or metal precursor deposited together with the protective colloid may also be varied, depending upon the particular colloidal materials being used. The original deposit of catalytic metal may be in partly reduced form, as a mixed deposit of the colloidal metal and a colloidal metallic compound, or it may be wholly in the form of colloidal metal particles, or wholly in the form of a colloidal precursor compound which is subsequently reduced to colloidal metal particles as described below. The choice on this matter depends upon the chemical properties of the stabilizing metal oxide. The essential variable is to choose a precipitant and precipitating conditions which will bring the catalytic metal and the stabilizing oxide down in the form of a simultaneously precipitated colloidal dispersion. In many cases it may be preferred to initiate the precipitation of either the catalytic metal or the stabilizing oxide alone, whichever is brought down more slowly with the precipitant, in the absence of the other constituent, which is then added after the precipitation has been initiated so that the final deposition will occur at about the same time.

In addition to the catalytic metal component, the stabilizing supporting oxide and the separate catalyst support, if any, will contribute essential effects in determining the activity of the catalyst. For this reason, proper choice of the chemical and physical composition of the hydrous oxide or oxides used is an important element in the preparation of these improved reforming catalysts. The catalyst support is a porous, adsorptive material, capable of giving a stable structure and large free surface to the finished catalyst. In cases where the catalyst is to be used in the form of granules or pills, the desired structure is one which will give a certain minimum crushing strength and resistance to shrinkage as a necessary property of the finished material. In other cases where the catalyst is to be used in the form of more finely divided particles and handled by the fluidized solids technique, a necessary property is a certain abrasion resistance, to minimize any tendency to dusting or changes in surface composition. In either case, regardless of the method in which the catalyst is to be used, it is highly desirable to have a preparation which will retain its chemical properties essentially unchanged during long periods of use. In this respect it is important that the catalyst retain not only its activity but also its selectivity for the type of chemical reaction which it promotes.

For hydroforming processes according to this invention when using hydrogen regeneration only, activated carbon or various adsorptive metal oxides may be employed as the base or carrier. Where oxidative regeneration is required, carbon is not a suitable base and any of various oxide bases may be preferred.

In addition to its physical or mechanical effect upon the amorphous or colloidal particles of catalytic metal component, the stabilizing oxide in this catalyst cooperates chemically and physically with the catalytic metal as part of the catalyst support in determining the properties of the finished catalyst. More specifically, a catalyst on a silica base may be prepared by treating a platinum-containing silicate or alkyl silicate solution with a coagulating agent to deposit hydrated silica along with the catalytic metal. A similar technique can be employed to deposit platinum together with hydrated silica as a protective colloid upon a preformed silica base, or upon an alumina base or other suitable support. On the other hand, catalysts employing alumina as a protective colloid may be deposited from an alumina hydrosol or by the hydrolysis of an aluminum salt or an aluminum alcoholate or other suitable aluminum compound. Again, alumina might be used as a protective colloid on an alumina base or on a commercial active alumina, which might also contain a certain amount of silica or titania as a minor component. Still another metal oxide may be used as a separate protective colloid, on a preformed carrier, particularly the hydrated oxides of chromium, zirconium, thorium, titanium or iron on an alumina or silica base. Any of these oxides or combinations between them can be used as a protective colloid with other types of catalyst carriers such, for example, as activated carbon.

Suitable methods of preparing catalysts according to the present invention will now be described. In the embodiment of principal interest here, the support itself may be prepared in colloidal form with simultaneous precipitation of the platinum in finely divided metallic form. According to this procedure, soluble compounds of the noble metal and the stabilizing oxide are combined in solution in the desired proportions and then treated with a precipitant or precipitants capable of precipitating both components in the desired colloidal form at about the same time.

When a preformed support such as $Al_2O_3$, $SiO_2$, activated carbon, $SiO_2$-$Al_2O_3$, or the equivalent is to be employed, it may be impregnated with separate or mixed solution of the metal and stabilizing compounds before this precipitation step. Or, the support may be impregnated with a sol containing the two components in colloidal suspension. In many such cases, it is preferable to use colloidal alumina on an alumina support and colloidal silica on a silica support. Colloidal $ZrO_2$ or $Cr_2O_3$ can be similarly used as the protective colloid alone, or with one of the above supports.

Numerous methods of preparing $SiO_2$, $Al_2O_3$, $ZrO_2$, or $Cr_2O_3$ in the form of colloidal hydroxides have been described. Some of these methods can be utilized in the presence of soluble salts of platinum with gelling agents that simultaneously coagulate the platinum. Thus, alcoholates of silicon and aluminum may be hydrolzed to form colloidal gels of the corresponding hydroxides while simultaneously precipitating platinum from the same solution.

A convenient means of bringing platinum down from aqueous solution together with the colloidal hydroxides of Al, Zr or Cr, in the presence or absence of a preformed support, involves the use of ethylene oxide as a precipitant. Mixed chloride solutions of one or more of these elements and of platinum may be prepared in the proportion desired and then treated in the wet state with gaseous ethylene oxide. The same solutions may be added separately or together to a suitable catalyst support and then treated, or the support may be impregnated with a mixed solution of the chlorides and of ethylene oxide. In preparing such a solution the stabilizing component chloride may be allowed to react with the ethylene oxide before adding the platinum chloride in order to obtain the desired simultaneous precipitation.

Platinic chloride may also be introduced into an acid peptized or salt peptized sol of the stabilizing hydroxide and then treated with a suitable weakly basic reacting material. Sols may be prepared by known procedures such as dialysis followed by peptization, hydrolysis of alcoholates, etc. Chromia gels may be prepared in situ with platinum by simultaneous reduction of a solution of chromic acid and platinic chloride with a reducing agent such as alcohol, sugar, etc. Ammonium acetate precipitation of a mixed solution of chromic nitrate and platinic chloride may also be used. All of these methods possess a distinct advantage over conventional methods of precipitating with $H_2S$ or $NH_4OH$, since it is difficult to avoid selective precipitation of one component with these reagents. Other catalysts may be prepared according to this invention as follows:

1. Addition of aniline to a methanol solution of aluminum nitrate;
2. Addition of MgO to aluminum salt solution;
3. Addition of sodium silicate to dilute acid, etc.

In such methods, it is relatively simple to introduce the platinum and coagulating agent at spaced times so that the coagulation will be approximately simultaneous for both components.

The above described methods may be used on either a fluoride treated or an untreated base, if desired, or the catalyst may be treated with a fluoriding compound after the noble metal and stabilizing additive have been precipitated. A specific description of several catalysts prepared according to this invention is given below:

*Example I.—99.5 $Al_2O_3$–0.5 Pt*

2250 grams of $AlCl_3.6H_2O$ are dissolved in water and made to a volume of 7 liters. After cooling to 10° C. the solution is stirred vigorously while adding 1600 cc. of liquid ethylene oxide followed by 150 cc. of platinic chloride solution (2.39 g. Pt). The addition of ethylene oxide before the platinum gives a perfectly clear solution with no precipitation of alumina for a period of about two hours. This allows ample time for adding the platinum chloride solution to a homogeneous solution of aluminum chloride before any alumina is precipitated. The resulting solution of aluminum chloride, platinum chloride and ethylene oxide is then allowed to react over a period of about four hours and the resulting gel is broken up and dried at room temperature. The catalyst thus prepared is reduced at 900° in a stream of hydrogen before use. On testing at 900° and atmospheric pressure feeding methylcyclohexane at a feed rate of 1 v./v./hr. it is found to be highly active, giving a liquid product containing 95–97% of toluene which is substantially a quantitative conversion. This catalyst also shows excellent activity and stability when used for naphtha hydroforming.

*Example II.—99.5 $Al_2O_3$–0.5 Pt*

To prepare a coprecipitated catalyst supported on granular activated alumina, 333 g. of $AlCl_3.6H_2O$ is first dissolved in 200 cc. of water and mixed with 88 cc. of platinic chloride solution (3.5 g. Pt). After cooling in ice, 250 cc. of liquid ethylene oxide is stirred in while cooling with ice. This mixed solution, along with 100 cc. added water, is then used to impregnate 665 g. of an activated alumina such as Alcoa grade H–41. After drying at room temperature the catalyst is heated for 6 hours at 250° F. and for 16 hours at 400° F. before final reduction and use for hydroforming or dehydrogenation reactions.

*Example III.—94 $Al_2O_3$–0.5 Pt–5.0 $Al_2O_3$*

206 g. of $AlCl_3.6H_2O$ are dissolved in water and diluted to a volume of 500 cc. This solution is cooled to 10° C. and 200 cc. of liquid ethylene oxide is added. After standing for 15 min. a solution of 7.5 g. $PtCl_4$ in 100 cc. $H_2O$ is stirred in. The resulting solution is used to impregnate 820 g. of granular activated alumina previously calcined for six hours at 1300° F. After standing 24 hours the catalyst is dried at room temperature and then at 220° F. The temperature is then slowly increased to 1000° F. and the catalyst calcined 3 hours at this temperature.

*Example IV.—94 $Al_2O_3$–0.5 Pt–2.5 $Al_2O_3$*

This catalyst is prepared the same as that in Example III except that half as much aluminum chloride is used and this solution is reacted with an equivalent amount of MgO as a coagulating agent instead of using ethylene oxide.

*Example V.—100 $Al_2O_3$+0.5 Pt+5$SiO_2$*

73.6 cc. of ethyl ortho silicate are mixed with 76 cc. of isopropyl alcohol and stirred into a solution of 10 cc. of concentrated hydrochloric acid in 40 cc. of water. This solution is allowed to stand until a noticeable increase in its viscosity has taken place. A solution of 3.6 g. of platinic chloride ($PtCl_4$) in 20 cc. of water is stirred in and 20 cc. of liquid ethylene oxide added. This solution is then used to impregnate 400 g. of a calcined (1300° F.) active alumina gel which has a surface area of about 250 square meters per gram. After standing at room temperature for about 24 hours the granules are dried slowly at 220° F. and then calcined for 3 hours at 1200° F.

*Example VI.—100 $SiO_2$–0.5 Pt–5 $SiO_2$*

Same as Example V except that 400 grams of silica gel (which had been activated at 600° F.) are used in place of the 400 grams of alumina.

*Example VII.—99.7 $SiO_2$–0.3 Pt*

A solution of 675 cc. of water, 675 cc. of alcohol and 169 cc. of concentrated hydrochloric acid is mixed with a solution of 1350 cc. of ethyl ortho silicate in 675 cc. of alcohol. After standing fifteen hours a solution of 1.9 grams of $PtCl_4$ in 20 cc. of water is added. To this solution is added 50 cc. of liquid ethylene oxide. The solution, held at 55° C., sets to a clear gel in 4 hours. After two days the gel becomes very black. It is then dried slowly and calcined 3 hours at 1000° F.

*Example VIII.—99.5 $SiO_2$–0.5 Pt*

One liter of solution of sodium silicate diluted to a specific gravity of 1.185 (22.6% of 1 $Na_2O$–3.36 $SiO_2$) is vigorously stirred into an equal volume of 10% hydrochloric acid. A solution of 2.3 g. $PtCl_4$ in 30 cc. of water is stirred in and then 25 cc. of liquid ethylene oxide are added. The resulting sol is allowed to set to a gel, and after standing for two days the gel is broken up, washed thoroughly with water, dried slowly and calcined three hours at 1000° F.

The term "colloidal" or "colloidal dispersion" as used in the present application, defines an amorphous state of matter as distinguished from the crystalline state. It may refer either to finely divided particles in the case of the catalytic metal or the rudimentary metal-containing deposit from which the catalytic metal is to be obtained by reduction, or a network of partly hydrated metal oxide macromolecules in the case of the stabilizing oxide or the catalyst carrier. The term "colloidal" as used in this way defines partly the size of the particles or macromolecules concerned, in general about 100 to 1,000 Angstrom units or finer in size. It also defines the amorphous nature, as distinguished from the crystalline form which can exist for many of these materials and particles of the same size range, as well as for larger particles. This amorphous nature of the colloidal dispersions has an important bearing on surface characteristics, including hydration and adsorptive capacities. Thus it has a major determining influence on catalytic properties, and a large number of the porous adsorptive materials used as catalysts are colloidal in nature.

The reforming process for which these catalysts are particularly suited is the process known as hydroforming, which converts a naphtha feed stock into a naphtha product of improved anti-knock properties. This is an operation carried out in the presence of a solid catalyst and in an atmosphere containing free hydrogen but without a net consumption of hydrogen. In hydroforming operations, hydrogen is evolved by the transformation of other hydrocarbons including naphthenes into aromatics. A certain amount of hydrogenation may take place if the feed stock to the hydroforming step contains olefinic material, and a small amount of hydrocracking may be involved with the formation of lower molecular weight saturated hydrocarbons. The amount of hydrocracking in particular may be promoted or minimized as desired by suitable changes in the operating conditions of temperature and pressure or in the composition of the catalyst, as discussed above.

The naphtha feed stock to be treated by this reforming process can be derived from a wide variety of sources.

It is most commonly a hydrocarbon stream derived at least in part directly from petroleum, in the form of straight run or virgin naphtha. It may also contain secondary naphtha products derived from petroleum, such as naphthas produced by thermal cracking or catalytic cracking processes. It may also contain any of a variety of synthetic naphthas which may be produced from hydrocarbon or carbonaceous raw materials by a variety of processes including direct gasification, the catalytic reduction of carbon monoxide and other thermal or catalytic reactions. The term naphtha will be understood to include both light naphthas and heavy naphthas from any of these sources, including various hydrocarbons and a certain amount of hydrocarbon derivatives, within the boiling range from approximately 0–450° F.

The platinum-containing catalysts of the present invention are particularly useful for hydroforming operations carried out under conditions where the catalyst becomes rapidly fouled with a carbonaceous deposit caused by the degradation of some of the constituents of the feed stock into coke. An example of such an operation is the so-called "low pressure hydroforming," at a pressure in the range of about 100–300 lbs. per sq. in. as contrasted to high pressure operation in the range of 750 lbs. per sq. in. where very little or no such coke deposits are formed. The improved octane number of the product obtained under low pressure operating conditions compensates for the disadvantage which this coke production entails when using a catalyst prepared according to the present invention to withstand repeated cyles on stream and in regeneration without loss in activity and in selectivity for the desired reactions. The regeneration treatment involved to remove the carbonaceous deposit or coke laid down in the hydroforming process under these conditions may be hydrogen treatment in the absence of the feed stock. In other cases where hydrogen treatment alone is not sufficient to keep the catalyst satisfactorily free of coke, a more intensive regeneration procedure may be employed to burn the coke deposit in a stream of air or other oxygen-containing gas. This alternating cycle of regenerative oxidation and on-stream reduction of the metallic constituents is especially harmful in converting the amorphous highly active catalytic metal particles into the crystalline relatively inactive form. The superior properties of the stabilized catalysts prepared according to the present invention are particularly evident by contrast with the rapid loss in activity which conventional platinum catalysts undergo under relatively severe operating conditions of this type.

It will be understood that the above examples merely illustrate methods of obtaining protective supporting oxides and platinum mutually dispersed and coagulated in colloidal form. As previously indicated there are a wide variety of methods of obtaining sols and gels of the stabilizing oxides and it is within the scope of this invention to use any of these methods which are compatible with the controlled precipitation of platinum or a platinum compound in colloidal form from one of its soluble compounds. The most important feature of the invention is this controlled precipitation, which means that the colloidal platinum-containing deposit is precipitated or coagulated at the same time as the colloidal stabilizing oxide or carrier gel. Since the precipitation or coagulation of the colloidal hydrous oxide carrier is ordinarily a slow process, this necessarily means that the platinum is also to be brought down slowly out of solution. Any other procedure will almost certainly involve bringing down one element of the catalyst composition before the other, which means a less intimate degree of dispersion and is exactly what the present invention seeks to avoid.

What is claimed is:

1. The method of preparing an alumina supported catalyst for the treatment and conversion of hydrocarbons which comprises colloidally dispersing from about 0.05 to 2.0% of metallic platinum in a hydrous alumina by simultaneously precipitating a platinum-containing deposit and said alumina from an aqueous solution of platinum and aluminum salts by the separate precipitating action on these salts of a common reagent, selected from the group consisting of ethylene oxide, ammonium acetate, magnesium oxide, aniline, and alcohol, recovering therefrom a platinum-containing alumina, and reducing the platinum therein to the form of the free metal.

2. The method according to claim 1 in which said platinum-containing deposit comprises platinum oxide, and said common precipitate is dried and subsequently reduced to convert said oxide to the free metal to prepare a finished catalyst.

3. The method according to claim 1 in which said reagent has a reducing action on said platinum salt, said platinum-containing deposit is colloidally dispersed throughout said hydrous alumina as a colloidal dispersion of metallic platinum, and said platinum-alumina composite is dried directly to recover a finished catalyst.

4. The method of preparing an alumina-supported noble metal catalyst for the treatment and conversion of hydrocarbons which comprises treating an aqueous solution of an aluminum salt with a coagulating and precipitating agent selected from the group consisting of ethylene oxide, ammonium acetate, magnesium oxide, aniline and alcohol, which causes the slow precipitation of hydrous alumina therefrom, subsequently adding to said solution a minor amount of a soluble salt of a catalytic noble metal which is also slowly but more rapidly precipitated than said alumina in the presence of said precipitating agent, adjusting the time of addition of said salt solution according to said relative rates of precipitation, simultaneously precipitating said alumina and a deposit containing said noble metal catalyst in an amount equivlent to from about 0.05 to 2.0% by weight of said metal on finished catalyst, drying said common precipitate and recovering therefrom a finished catalyst in the form of a colloidal hydrous alumina with said noble metal deposit colloidally dispersed therethrough, said method including the steps of reducing the noble metal to the form of the free metal.

5. The method of preparing a platinum-on-alumina catalyst for the treatment and conversion of hydrocarbons which comprises dissolving chloroplatinic acid and aluminum chloride in aqueous solution, incorporating in said solution a coagulating reagent selected from the group consisting of ethylene oxide, ammonium acetate, magnesium oxide, aniline, and alcohol having a slow hydrolyzing and precipitating action releasing a hydrous alumina from said aluminum chloride, said reagent having a separate slow precipitating action on platinum in said solution, precipitating platinum and a hydrous alumina gel simultaneously thereby from said solution in the form of a hydrous alumina base having a finely divided platinum-containing deposit colloidally dispersed therethrough, drying and recovering a catalyst in which said platinum deposit comprises from about 0.05 to 2.0% by weight of platinum based upon said alumina, said method including the step of reducing the platinum to the form of the free metal.

6. The method of preparing a platinum-on-alumina catalyst for the catalytic reforming of naphtha which comprises adding ethylene oxide to an aqueous solution of aluminum chloride, subsequently adding chloroplatinic acid to said solution in an amount equivalent to from about 0.05 to 2.0% by weight of platinum based on finished catalyst prior to any increase in viscosity indicative of incipient sol formation and gelation, simultaneously precipitating a platinum-containing deposit and coagulating hydrous alumina from said solution thereby in the form of a colloidal dispersion of said platinum deposit in hydrous alumina, reducing the platinum to the form of the free metal and drying said common precipitate and recovering therefrom a finished catalyst.

7. The method of preparing a platinum-on-alumina catalyst for the treatment and conversion of hydrocarbons which comprises dissolving together a minor amount of chloroplatinic acid equivalent to from about 0.05 to 2.0% by weight of platinum based on finished catalyst, an aluminum salt, and ethylene oxide in aqueous solution, precipitating simultaneously thereby from said aqueous solution a colloidal hydrous alumina and a platinum-containing deposit colloidally dispersed therethrough, reducing the platinum to the form of the free metal and drying said common precipitate and recovering therefrom a finished catalyst.

References Cited in the file of this patent

UNITED STATES PATENTS

| | | |
|---|---|---|
| 2,394,796 | Marisic | Feb. 12, 1946 |
| 2,395,153 | Thomas et al. | Feb. 19, 1946 |
| 2,419,272 | Marisic | Apr. 22, 1947 |
| 2,478,916 | Haensel et al. | Aug. 16, 1949 |
| 2,583,254 | Hunter | Jan. 15, 1952 |
| 2,606,159 | Owen | Aug. 5, 1952 |